Figure 1:
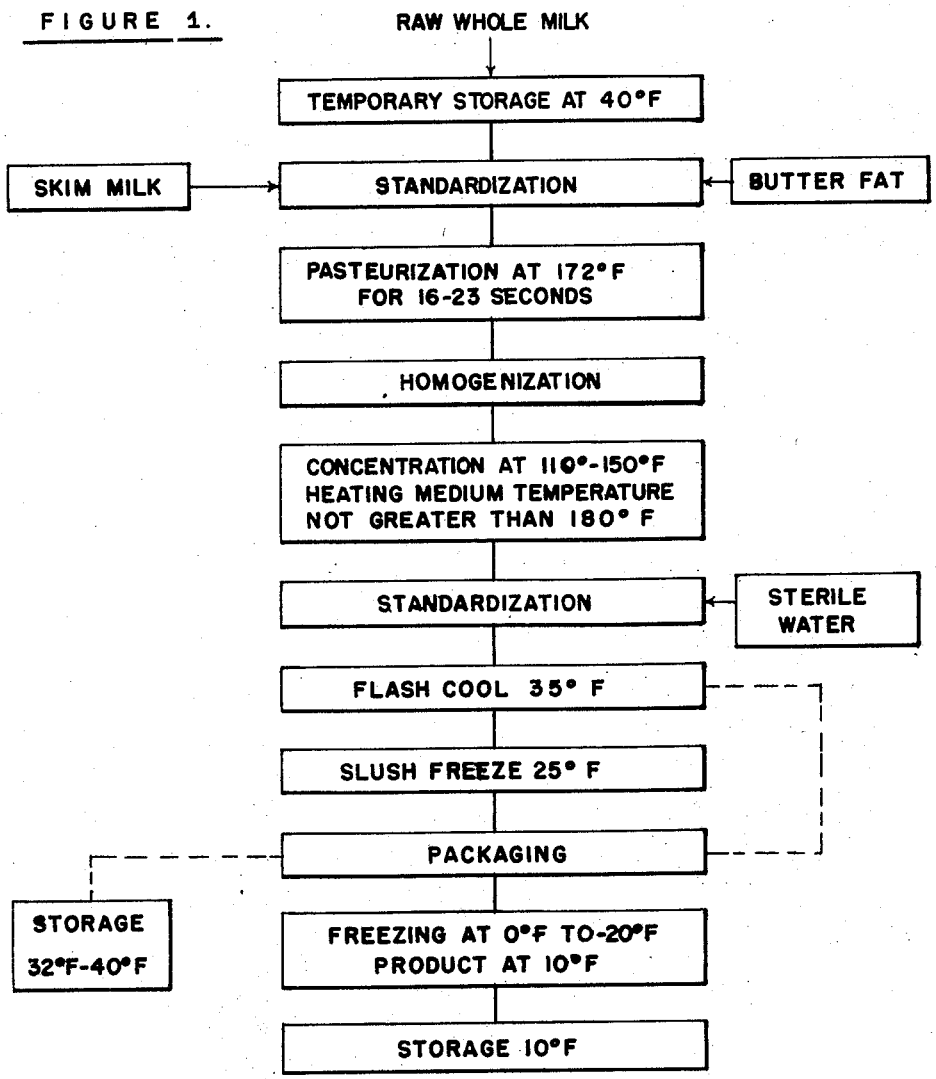

Nov. 18, 1958     J. F. KEVILLE, JR     2,860,988
PROCESS OF CONCENTRATING MILK AND MILK PRODUCTS
Filed Feb. 16, 1954     2 Sheets-Sheet 1

INVENTOR.
Jesse F. Keville, Jr.
BY Herman Seid
Atty.

2,860,988
PROCESS OF CONCENTRATING MILK AND MILK PRODUCTS

Jesse F. Keville, Jr., Syracuse, N. Y., assignor to Carrier Corporation, Syracuse, N. Y., a corporation of Delaware Application February 16, 1954, Serial No. 410,666

7 Claims. (Cl. 99—55)

This invention relates to a process of concentrating milk and milk products and, more particularly, to a process of preparing frozen concentrated milk which may be maintained in storage for periods as great as one year without affecting substantially flavor or stability of the stored milk when it is reconstituted for use.

The phrase "milk and milk products" is used herein to designate whole milk of any butter fat content, skim milk, whey, sweetened skim milk, cholocolate skim milk, and chocolate whole milk.

Procedures heretofore followed in concentrating milk have not resulted in a product which could be stored for an extended period of time without affecting deleteriously the flavor and stability of the stored product. In many cases, oxidation resulted, imparting an undesirable wet-cardboard flavor to the product. In other cases, concentration and/or pasteurization or sterilization were conducted at too high temperatures or for extended periods which imparted a cooked or scorched flavor to the product when reconstituted. A serious disadvantage of prior procedures resides in the loss of stability during storage. This is noticeable on defrosting by the granular coagulation of the product which seems to be caused by the tendency toward flocculation of the casein contained in the product. Thus, a limiting factor in the frozen storage of concentrated milk is the rate at which casein loses its stability to be reconstituted in a normal dispersion after defrosting.

The chief object of the present invention is to provide a process of concentrating milk and milk products which obviates the disadvantages inherent in prior procedures.

An object of the present invention is to provide a process of concentrating milk and milk products which permits the concentrate to be maintained in frozen storage for extended periods of time without substantial loss of stability or flavor and to be easily reconstituted for consumption.

A further object is to provide a process of concentrating milk and milk products in a falling film evaporator at a temperature within the range of about 110° to 150° Fahrenheit in heat exchange relation with a heating medium at a temperature not greater than about 180° Fahrenheit. Other objects of the invention will be readily perceived from the following description.

This invention relates to a process of concentrating milk and milk products in which the steps consist in contrating the milk at a temperature within the range of about 110° to 150° Fahrenheit by repeated passage in heat exchange relation with a heating medium having a temperature not greater than about 180° Fahrenheit, preferably, in a heat exchanger such as a falling film evaporator, cooling the concentrate, packaging the concentrate, and placing the packaged concentrate in storage; preferably, the packaged concentrate is maintained at a temperature not greater than about 10° Fahrenheit without substantial fluctuation for the entire time it is stored. Pasteurization and/or homogenization of the milk and milk products may be conducted prior to or after the step of concentration.

Figure 2:
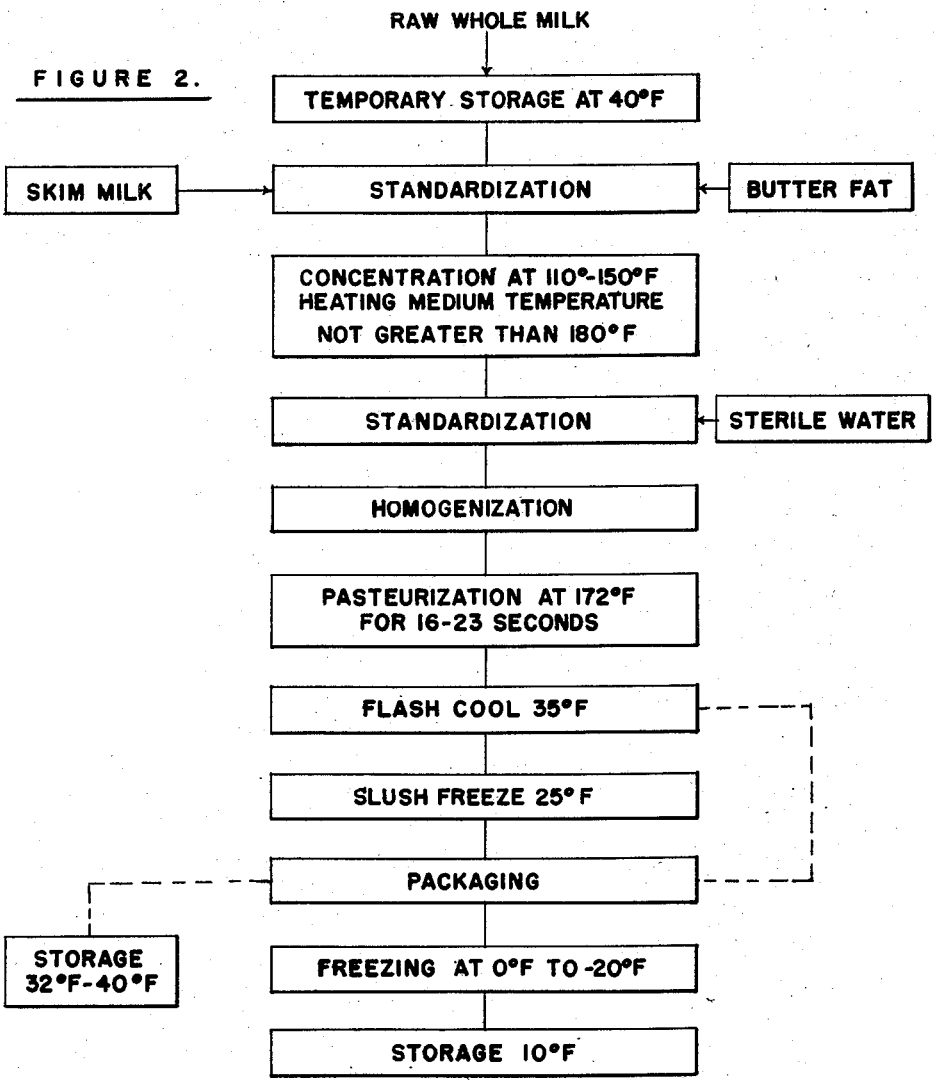

The attached drawings illustrate a preferred embodiment of the invention, in which:

Figure 1 is a diagrammatic view embodying a flow diagram of the process of concentrating milk and whole milk products; and Figure 2 is a diagrammatic view similar to Figure 1 ilustrating a modified process of concentrating milk and milk products.

Referring to the flow diagram illustrated in Figure 1, raw whole milk is brought to the processing plant, and held in temporary storage at a temperature of about 40° Fahrenheit. Preferably, during temporary storage, slow speed agitation of the milk is conducted to keep the butterfat well mixed into the milk, and to facilitate cooling in a cold wall or cold plate type tank. It will be appreciated if the milk upon its arrival at the processing plant is already cooled to a temperature of about 40° Fahrenheit, storage in a refrigerated room is adequate.

At the time of arrival of the whole milk at the processing plant, quality tests are conducted, such tests consisting of smell and taste, alcohol, sediment, mastitis, bacteria and coli count, and butter fat content. Tests are conducted to determine the total solids and other usual characteristics of the milk in order to obtain a milk of the composition desired for the procedure. A typical composition is about 3.5% butter fat content with 8.7% non-fat solids content.

The milk is standardized to the desired composition by the addition of butter fat or of skim milk. If desired, if the whole raw milk contains too great butter fat content, the additional butter fat may be removed by partial centrifugation. The concentration procedure of my invention removes only the water from the milk. Upon reconstitution, the butter fat and non-fat solids ratio will be in the same proportion as established at standardization.

Preferably, pasteurization of the milk is then conducted. The pasteurizing step is conducted by heating the milk at a temperature of about 172° Fahrenheit for a period within the range of 16 to 23 seconds. It will be appreciated, however, that if pasteurization is conducted after concentration of the milk, this pasteurization step may not be necessary. Pasteurization during this stage of the procedure has no deleterious effect upon the final product, except that it may affect the viscosity of the final product to some extent. It is beneficial since it decreases the bacteria count, and decreases the chances of contamination in the homogenizer and feed lines to the concentrator.

The pasteurized milk is then passed through a homogenizer of standard design to break up the fat content into fine particles, and evenly distribute the particles throughout the liquid, thereby imparting a uniform consistency to the liquid. The pressure of homogenization or the number of stages of the homogenizer does not necessarily determine the quality of homogenization. Preferably, in my procedure, the average size of the fat globules should be about two microns. I have found with homogenizers of standard design, a first stage of homogenization at 2000 pounds per square inch gauge pressure, and a second stage at 500 pounds per square inch gauge pressure are satisfactory.

The homogenized milk is then forwarded to a falling film concentrator. The concentrator is at a vacuum within the range of about 22.3 to 27.3 inches mercury vacuum, and the shell side temperature is raised to the desired heating medium temperature. The heating medium may be either steam, preferably not superheated, or hot water, and must not exceed a temperature of about 180° Fahrenheit. Any other lower heating medium temperature may be used, but, under ordinary conditions of operation, this is not desirable since less evaporation is accomplished per square foot of heat transfer surface.

It is necessary that the milk be concentrated in the falling film concentrator at a temperature within the range of about 110° to 150° Fahrenheit and, preferably, at a temperature within the range of about 140° to 150° Fahrenheit. Temperatures without the range of 110° to 150° Fahrenheit are detrimental to the quality of the final product.

The falling film concentrator is of standard design with concentrate hold up volume at a minimum, so as not to exceed a retention time of about two hours. A centrifugal or a positive displacement pump may be used for recirculating the concentrate. Preferably, the condensation of the vapors evolved is done in a barometric or surface type condenser. The concentrator is operated continuously with constant feed and constant product draw-off in the proper proportion to give the desired ratio of concentration. A density controller is preferably employed to maintain a constant specific gravity, and therefore a constant concentration of the product being removed.

If a density controller regulating the quantity of concentrate withdrawal from the concentrator is not used, then it is necessary to standardize the product in a standardization tank. A quantity of the concentrate is collected, mixed by means of a slow speed agitator and diluted with sterile water to obtain the final desired concentration of total solids. It is also possible to dilute with heavier, or higher solid content concentrates, provided the product has been under concentrated. This is not as desirable generally as establishing the process for a slight overconcentration if the exact desired concentration cannot be met easily.

Final concentration of the product may be established at any desired point up to approximately 43.5% total solids content, which corresponds to a 4 to 1 concentration by volume based on 12.2% total solids in the initial feed milk. If desired, the product may be concentrated to about 34% total solids content, which corresponds to about 3 to 1 by volume. In these cases, three volumes of water, or two volumes of water may be added respectively to arrive at the exact composition obtained after the first standardization of the milk.

After leaving the second standardization step, or the concentrator, if such final standardization step is omitted, the concentrate flows to a flash cooler, where it is cooled rapidly to a temperature of approximately 35° Fahrenheit. The concentrate is then further cooled to about 25° Fahrenheit in a slush freezer in which the concentrate is kept from freezing on the wall by moving scraper blades. It is desirable that the slush freezer be capable of rapidly dropping the temperature of the concentrate to about 25° Fahrenheit prior to canning or packaging. It is essential that the concentrate be quickly cooled. Any suitable means of cooling may be employed to accomplish the same purpose.

The concentrate is then canned or packaged in a conventional canner or packaging machine; preferably, the concentrate is packaged in small 6 oz. cans. Other forms of packages, may, of course, be used. I have found that small packages are more desirable than large packages, since in the subsequent freezing treatment, the material is frozen more quickly, which is important in contributing to the overall quality of the final product.

As indicated in Figure 1, the packaged concentrate is then forwarded to a freezing tunnel where the temperature of the concentrate is reduced to the final desired storage temperature as rapidly as possible. It is important that the temperature of the concentrate is not more than a few degrees below the desired final storage temperature although the ambient temperature of the freezing may be as low as minus 20° Fahrenheit.

The packaged concentrate is removed from the freezing tunnel at the final storage temperature and placed in storage. The storage temperature should not fluctuate more than about 5° Fahrenheit if maximum product quality is to be obtained. The storage temperature should not be higher than about 10° Fahrenheit, although lower temperatures may be employed if desired.

I have found that concentrate prepared as described above has a storage life as great as one year. Continuous processing, as described above, may materially increase the storage life beyond one year.

When it is desired to use the product, the concentrate is removed from storage and rapidly thawed by immersing in hot water. Rapid thawing of the concentrate is preferred since slow thawing may effect a thickening of the concentrate, so that it is difficult to dissolve in the water required for reconstitution.

Considering the procedure described above, under some circumstances, it may be desirable to take the concentrate directly to the packaging operation from the flash cooling stage rather than slush freezing the concentrate. This is indicated in the flow diagram by means of a dotted line. The concentrate is packaged and may then be placed in storage at refrigerated temperatures within the range of 32° to 40° Fahrenheit. This, of course, is unfrozen storage, and the product may be expected to have a shelf life of about two weeks.

In Figure 2, I have shown a flow diagram illustrating a modified process. In this modified process, the homogenization and pasteurization steps are conducted after the concentrating operation. If homogenization has not been conducted prior to the concentrating operation, it is essential that homogenization be conducted at this point. Since certain state and health codes require final pasteurization, pasteurization may be conducted after the concentrating step. I have found that when pasteurization is conducted after the concentrating operation, such pasteurization should be conducted at a temperature of about 172° Fahrenheit for a period of about 23 seconds. It will be appreciated that the step of pasteurization prior to concentration may be eliminated and the concentrate pasteurized after the step of concentration. Likewise, the milk product may be homogenized prior to or subsequent to concentration. These steps may be interchanged as desired without substantial effect upon the product.

I have described above that whole milk may be taken from its naturally occurring composition to any point up to 44% total solids content. Skim milk may be easily concentrated to 45% total solids content, while sweetened skim milk has been concentrated to as great as 79% total solids content. Plain condensed whey may be successfully produced up to 73% total solids content. It will be appreciated that in the case of skim milk, sweetened skim milk, and whey the procedures shown in the attached flow diagrams would be modified since homogenization is not required; minor other changes may be made as desired to adapt the procedure to the specific products.

Concentrated chocolate skim milk, or chocolate whole milk may be made merely by injecting the proper amount of chocolate flavoring sirup or other flavoring constituents either before or after the concentration step. It may be desirable to add the flavoring constituents before concentration, since mixing into the less viscose material is accomplished more easily.

I have found that a desirable by-product of the concentration procedure is a creamy paste which consists of concentrated milk thickened by increasing the temperature of the concentrate after it has been packaged. Such thickening should be conducted at a temperature such that sterilization will occur so that the thickened paste may have an indefinite shelf life at room temperature. For example, the temperature may be about 230° Fahrenheit for a period of about 30 minutes. Such a product is useful as a pie filling, or may be used as an ingredient in many other cooking procedures.

The present invention provides a procedure for concentrating milk and whole milk products which does not affect substantially the flavor or stability of the concentrate. The product may be easily reconstituted for use, and may be stored for periods as great as one year. Under certain circumstances, I have found that the concentrate may be stored for period greater than one year. An advantage of the invention resides in the fact that the concentrate may be stored at a temperature as high as 10° Fahrenheit, which greatly reduces the refrigerating cost required in storage. A concentrated whole milk product may be obtained in a concentration as great as 4 to 1 by volume. Such a product may be stored, as pointed out above, for a period as great as one year without affecting deleteriously the flavor or stability of this stored product.

While I have described a preferred embodiment of the invention, it will be understood that the invention is not limited thereto, since it may be otherwise embodied within the scope of the following claims.

I claim:

1. In a process for concentrating milk and milk products, the steps which consist in concentrating the milk in a vacuum within the range of 22.3 to 27.3 inches of mercury and at a temperature within the range of 110° to 150° Fahrenheit by repeated passage in heat exchange relation with a heating medium having a temperature not greater than about 180° Fahrenheit, cooling the concentrated product, packaging the cooled concentrated product, and placing the same in storage.

2. In a process for concentrating milk and milk products, the steps which consist in concentrating the milk in a vacuum within the range of 22.3 to 27.3 inches of mercury and at a temperature within the range of 110° to 150° Fahrenheit by repeated passage in heat exchange relation with a heating medium having a temperature not greater than about 180° Fahrenheit in a falling film concentrator, cooling the concentrated product, packaging the cooled concentrated product and placing the same in storage.

3. In a process for concentrating milk and milk products, the steps which consist in concentrating the milk in a vacuum within the range of 22.3 to 27.3 inches of mercury and at a temperature within the range of about 110° to 150° Fahrenheit by repeated passage in heat exchange relation with a heating medium having a temperature not greater than about 180° Fahrenheit, cooling the concentrated product, packaging the cooled, concentrated product, freezing the concentrate to a temperature not greater than about 10° Fahrenreit and storing the frozen product at a temperature not greater than about 10° Fahrenheit and at substantially the temperature of the product after the freezing operation.

4. In a process for concentrating milk and milk products, the steps which consist in pasteurizing the milk at a temperature of about 172° Fahrenheit for a period of about 16 to 23 seconds, homogenizing the pasteurized milk for a period such that the average size of the fat globules is about 2 microns, concentrating the milk under vacuum within the range of 22.3 to 27.3 inches of mercury and at a temperature within the range of about 110° to 150° Fahrenheit by repeated passage in heat exchange relation with a heating medium having a temperature not greater than about 180° Fahrenheit, cooling the concentrate, packaging the cooled concentrate, freezing the packaged concentrate to a temperature not greater than about 10° Fahrenheit, and storing the frozen concentrate at a temperature not greater than about 10° Fahrenheit and at substantially the temperature of the frozen product leaving the freezing operation.

5. In a process for concentrating milk and milk products, the steps which consist in concentrating the milk in a vacuum within the range of 22.3 to 27.3 inches of mercury and at a temperature within the range of about 110° to 150° Fahrenheit by repeated passage in heat exchange relation with a heating medium having a temperature not greater than about 180° Fahrenheit, homogenizing the concentrate so that the average size of the fat globules contained therein is about 2 microns, pasteurizing the homogenized product at a temperature of about 172° Fahrenheit for a period of about 23 seconds, cooling the homogenized, pasteurized concentrate, packaging the concentrate, freezing the packaged concentrate to a temperature not greater than about 10° Fahrenheit, and storing the frozen concentrate at a temperature not exceeding 10° Fahrenheit and at substantially the temperature of the product leaving the freezing operation.

6. In a process for concentrating milk and milk products the step which consists in homogenizing the milk so that the average size of the fat globules is about 2 microns, concentrating the homogenized milk in a vacuum within the range of 22.3 to 27.3 inches of mercury and at a temperature within the range of 110° to 150° Fahrenheit by repeated passage in heat exchange relation with a heating medium having a temperature not greater than about 180° Fahrenheit, pasteurizing the concentrate at a temperature of about 172° Fahrenheit for a period of about 16 to 23 seconds, cooling the concentrated, homogenized product at a temperature of about 25° Fahrenheit, packaging the cooled concentrate, freezing the packaged concentrate to a temperature not greater than about 10° Fahrenheit and storing the frozen concentrate at a temperature not greater than about 10° Fahrenheit and at substantially the temperature of the product leaving the freezing operation.

7. In a process for concentrating milk and milk products, the steps which consist in concentrating the milk in a vacuum within the range of 22.3 to 27.3 inches of mercury and at a temperature within the range of 110° to 150° F. by repeated passage in heat exchange relation with a heating medium having a temperature not greater than about 180° F. to an approximate concentration of four to one by volume, cooling the concentrated product, packaging the cooled concentrated product and placing the same in storage.

References Cited in the file of this patent

UNITED STATES PATENTS

| | | |
|---|---|---|
| 1,964,279 | Webb | June 26, 1934 |
| 2,570,212 | Cross | Oct. 9, 1951 |
| 2,668,765 | Stimpson | Feb. 9, 1954 |
| 2,681,858 | Stimpson | June 22, 1954 |

OTHER REFERENCES

Food Industries, vol. 16, No. 7 (July 1944), pp. 76 to 78.